Sept. 22, 1959 J. C. TINSLEY 2,904,892
TWO-POINT LEVEL
Filed July 5, 1957
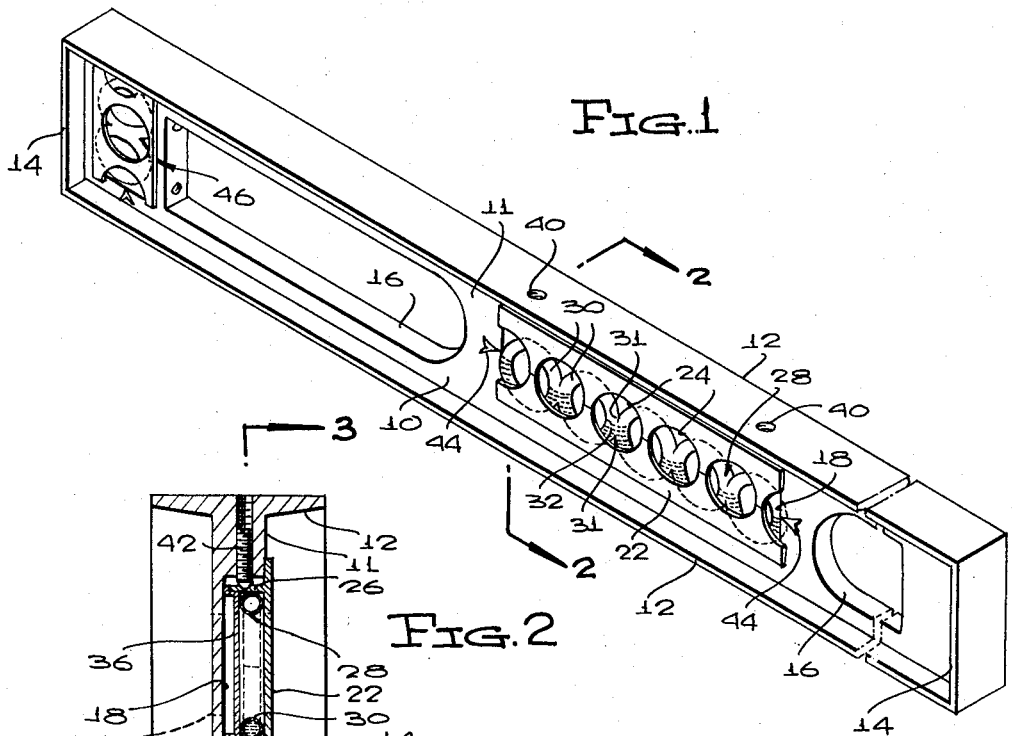
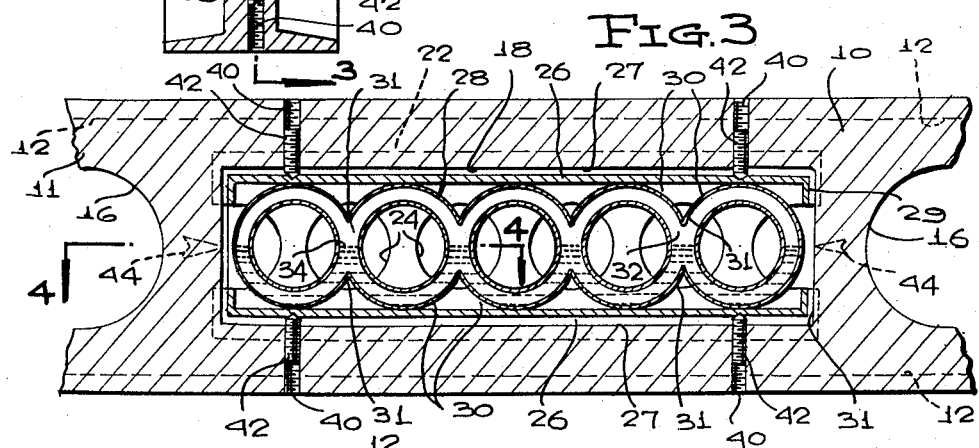
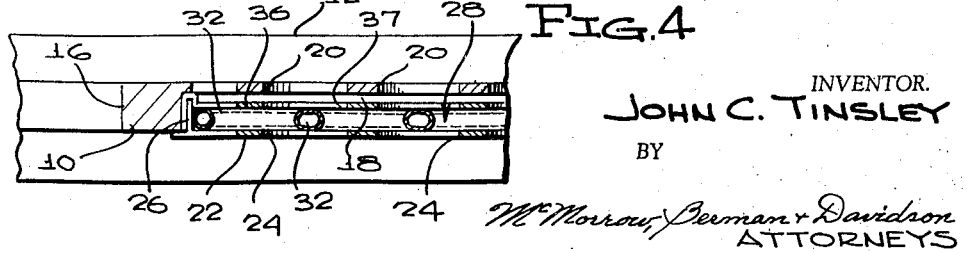
INVENTOR.
JOHN C. TINSLEY
BY
McMorrow, Berman & Davidson
ATTORNEYS United States Patent Office 2,904,892
Patented Sept. 22, 1959

2,904,892
TWO-POINT LEVEL
John C. Tinsley, Rocky Mount, N.C.
Application July 5, 1957, Serial No. 670,118
2 Claims. (Cl. 33—209)

This invention relates to levels, and more particularly has reference to a generally improved level, which will be possessed of a high degree of accuracy during both horizontal and vertical leveling, through the provision of a particular form and arrangement of a series of connected, communicating, annular elements holding the indicating fluid of the level.

One important object is to provide a level which will be possessed of a maximum degree of accuracy, by reason of the fact that fluid will be confined in a plurality of communicating, annular tubes, so that when the device is exactly horizontal, for example, readings can be taken at a substantial number of locations spaced longitudinally of the level, said locations being at the several points of communication between the several annular tubes.

A further object is to permit the several readings to be taken through the use of a single body of fluid, confined within the elongated series of tubes.

Another object is to permit the readings to be taken without the use of bubble tubes, through the provision of an arrangement in which the body of fluid substantially half fills the several annular tubes of the single series of tubes.

Another object is to provide a level as stated which will be characterized by the particular novel construction thereof, facilitating preassembly of the liquid-confining units and subsequent mounting of the same within the body of the level.

Another object is to provide for means whereby the liquid-confining assemblies may be adjustably positioned within the body of the level, to insure accurate setting of said assemblies in the body, before the initial use of the level.

Other objects will appear from the following description, the claims appended thereto, and from the annexed drawing, in which like reference characters designate like parts throughout the several views, and wherein:

Figure 1 is a perspective view of the level;
Figure 2 is an enlarged transverse section on line 2—2 of Figure 1;
Figure 3 is a longitudinal section, on the same scale as Figure 2, taken on line 3—3 of Figure 2; and
Figure 4 is a longitudinal section on line 4—4 of Figure 3, on the same scale as Figure 3.

Referring to the drawings in detail, the body 10 of the level is preferably formed of a metal such as cast aluminum, and includes a web 11 of elongated formation integral at its periphery with a flange 12 projecting laterally in opposite directions from the plane of the web, so that the body is of I-shaped cross section as shown in Figure 2. End flanges 14 are integral with the longitudinal flanges 12. The weight of the device is reduced through the provision of a plurality of elongated openings 16 formed in the web.

In one face of the web (Figure 2) there is provided an elongated, rectangular depression or recess 18, and in the bottom or back wall of said recess there are formed, at regularly spaced intervals along the length of the recess, circular viewing openings 20, opening upon the opposite face of the web. This is shown to best advantage in Figures 2 and 4.

A tube case 22 is of elongated, shallow, rectangular formation and in width and length is substantially smaller than the corresponding dimensions of the recess 18. The tube case has a front wall which is formed with circular, regularly spaced openings 24, aligned transversely of web 11 with openings 20 (Figure 4).

The longitudinal walls 26 of the tube case (Figure 3) are laterally spaced from the longitudinal walls 27 of recess 18. Further, the end walls 29 of tube case 22 are correspondingly, inwardly spaced from the end walls 31 of recess 18.

Within the tube case there is provided a series of integrally connected, endless, annular tubes, said series being generally designated 28. The several tubes are all in a common plane and the series extends the full length of the tube case, and also extends the full depth thereof as best shown in Figures 2 and 4.

The series of tubes comprises tubes 30, all equal in both outer and inner diameter and in cross-sectional area. The tubes 30 are in tangentially communicating relation as shown in Figure 3 with the outer diameters of the several tubes intersecting at points 31 where adjacent tubes are integrally connected in communicating relation, the points 31 of the intersecting outer circumferences of each pair of connected, communicating tubes being equidistantly spaced from a plane parallel to and located in parallel relation to the opposite faces of the flanges 12. The space between each pair of points 31, that is, the space common to both of adjacent, communicating tubes, has been designated 32 and is centered in the transversely aligned, respective openings 20, 24 as will be readily apparent from Figures 1, 3 and 4.

Within the series 28 there is provided a quantity of fluid which of course would be suitably colored and which would comprise any well known fluid used in levels, such as alcohol. The series is exactly half filled with the fluid, and therefore, when the device is perfectly horizontal, the level of the fluid 34 will be directly in said plane that occurs midway between the points 31. In other words, the points 31 provide visual check points whereby one can observe the level of the fluid at each of a number of different locations spaced longitudinally of the series. One can thus sight through each and all of the openings 20 or 24 (depending on what face of the level is being viewed) and can make a swift visual reading of the level of the fluid, to ascertain whether the fluid in the various spaces 32 is at a level equidistantly spaced from the points 31 above and below the same.

During the manufacture of the level, the series of tubes 28 in the tube case are preassembled, after which the tube case is inserted in the recess 18. The tube case has a back wall 36 which has openings registered with the several openings 20 and 24, as shown at 37 in Figure 4. The back wall 36 has a peripheral, rearwardly offset lip or flange 38 bearing against the inside wall of recess 18.

The entire tube case is now adjustably positioned, through the provision of a rectangular series of mounting screws 42, threaded in openings 40 that extend inwardly from the opposite faces of the level. In this connection it will be observed that the openings 40 are disposed adjacent the respective ends of the tube case, with corresponding openings 40 being axially aligned transversely of the level and extending into communication with recess 18. Screws 42 project inwardly from the opposite side walls 27 of the recess, bearing against the opposite side walls 26 of the tube case. It will be apparent that the tube case may be adjustably rocked about a transverse axis, until it is in the exact position desired within the recess. It is for this reason that the side and end walls of the tube case are spaced inwardly from the corresponding walls of the recess.

Marked upon the web 11 at opposite ends of recess 18 are index markings or arrows 44, which have their points in the mentioned plane that occurs midway between the points 31. In this way, one can determine at opposite ends of the series whether the fluid is in registration with the two index markings 44, so that said index markings can be used in conjunction with the several visible readings taken at the location of the spaces 32.

The level can of course be used for vertical checking, through the provision of a second tube assembly generally designated 46. This would be identical to that shown, except for having a smaller number of tubes, and except for having the series of tubes extending perpendicularly to the length of the series 48. Since the principles of construction are the same, it does not appear that there is any necessity for detailed description of the series 46.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A level comprising: a body having a planiform, work-contacting, peripheral surface and a laterally opening recess disposed inwardly from said surface; a tube assembly seating in said recess and including a plurality of communicating, annular tubes the centers of which lie in a common plane parallel to that of said surface; a quantity of liquid filling said tubes to a level such that said common plane will coincide with the level of the liquid in one position of said body; and means for fixedly mounting said assembly in the recess, comprising a plurality of screws threadedly engaged in the body and extending inwardly from the periphery of the body into opposite sides of said recess, said screws engaging the tube assembly for selective positioning of the tube assembly in the recess, said assembly being elongated in a direction longitudinally of said surface of the body, and being of approximately rectangular configuration, said screws being arranged in a rectangular series, one screw adjacent each corner of the assembly, said assembly including a tube case against which the screws engage, the several tubes being arranged in a series within said case, and being integrally connected to each other, the tubes of said series being in tangentially communicating relation, said body having openings transversely aligned with the tangentially communicating portions of the tubes for viewing of said portions through the openings, said tube case including a front wall extending as a closure of the open side of the recess, a flange projecting laterally inwardly from the front wall into the recess, said screws having conically tipped inner ends bearing in complementary depressions of the flange to provide the engagement of the screws with the tube assembly, and a back wall engaged peripherally against the flange and spaced forwardly from the closed side of the recess, the back and front walls of the tube case bearing against the respective opposite sides of the several tubes and having viewing openings aligned transversely of the tube assembly with said openings of the body.

2. A level comprising: a body having a planiform, work-contacting, peripheral surface and a laterally opening recess disposed inwardly from said surface; a tube assembly seating in said recess and including a plurality of communicating, annular tubes the centers of which lie in a common plane parallel to that of said surface; a quantity of liquid filling said tubes to a level such that said common plane will coincide with the level of the liquid in one position of said body; and means for fixedly mounting said assembly in the recess, comprising a plurality of screws threadedly engaged in the body and extending inwardly from the periphery of the body into opposite sides of said recess, said screws engaging the tube assembly for selective positioning of the tube assembly in the recess, said assembly being elongated in a direction longitudinally of said surface of the body, and being of approximately rectangular configuration, said screws being arranged in a rectangular series, one screw adjacent each corner of the assembly, said assembly including a tube case against which the screws engage, the several tubes being arranged in a series within said case, and being integrally connected to each other, the tubes of said series being in tangentially communicating relation, said body having openings transversely aligned with the tangentially communicating portions of the tubes for viewing of said portions through the openings, said tube case including a front wall extending as a closure of the open side of the recess, a flange projecting laterally inwardly from the front wall into the recess, said screws having conically tipped inner ends bearing in complementary depressions of the flange to provide the engagement of the screws with the tube assembly, and a back wall engaged peripherally against the flange and spaced forwardly from the closed side of the recess, the back and front walls of the tube case bearing against the respective opposite sides of the several tubes and having viewing openings aligned transversely of the tube assembly with said openings of the body, the tangentially communicating portions of the tubes being centered in the respective transversely aligned openings.

References Cited in the file of this patent

UNITED STATES PATENTS

| | | |
|---|---|---|
| 1,375,278 | Clayton | Apr. 19, 1921 |
| 1,393,328 | Thullen | Oct. 11, 1921 |
| 1,582,149 | Stowell | Apr. 27, 1926 |

FOREIGN PATENTS

| | | |
|---|---|---|
| 661,862 | Germany | June 29, 1938 |